April 10, 1934.  A. O. JAEGER  1,953,938
PURIFICATION OF BY-PRODUCT AMMONIA
Original Filed Nov. 21, 1927  5 Sheets-Sheet 1
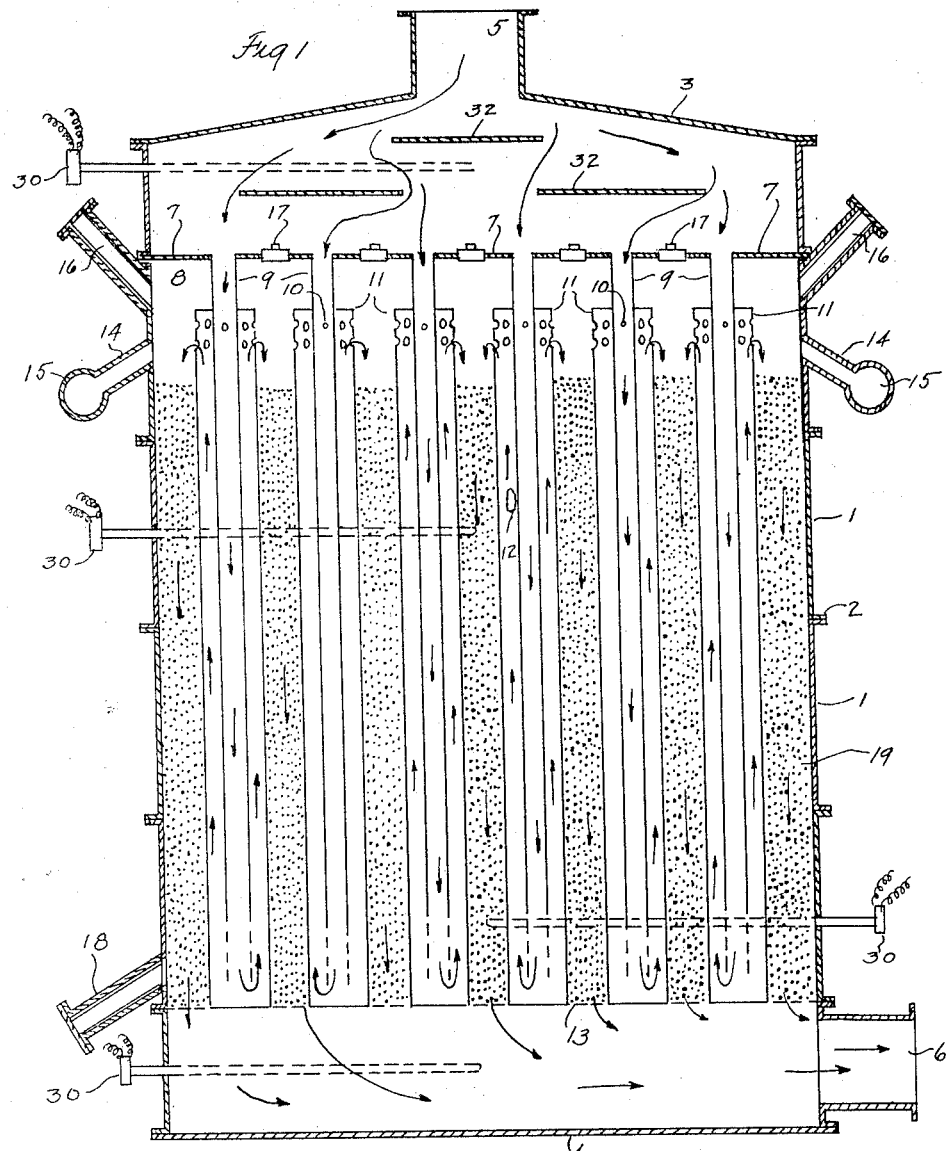
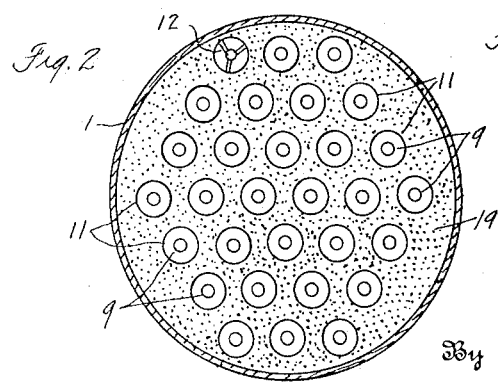
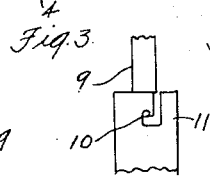
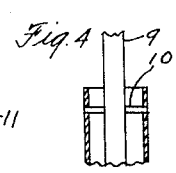
Inventor
Alphons O. Jaeger
By Robert Ames Norton
Attorney

April 10, 1934.    A. O. JAEGER    1,953,938
PURIFICATION OF BY-PRODUCT AMMONIA
Original Filed Nov. 21, 1927    5 Sheets-Sheet 2
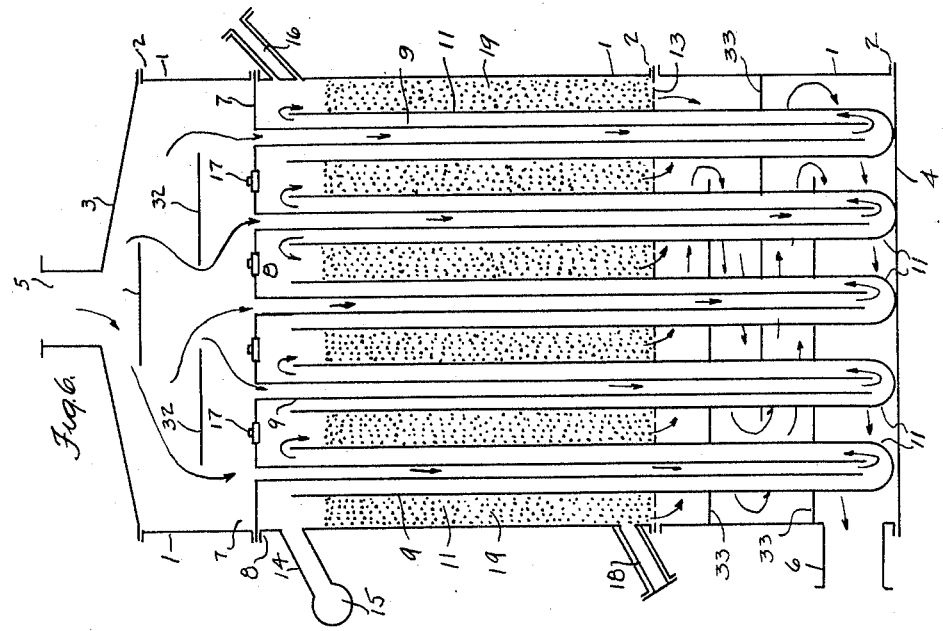
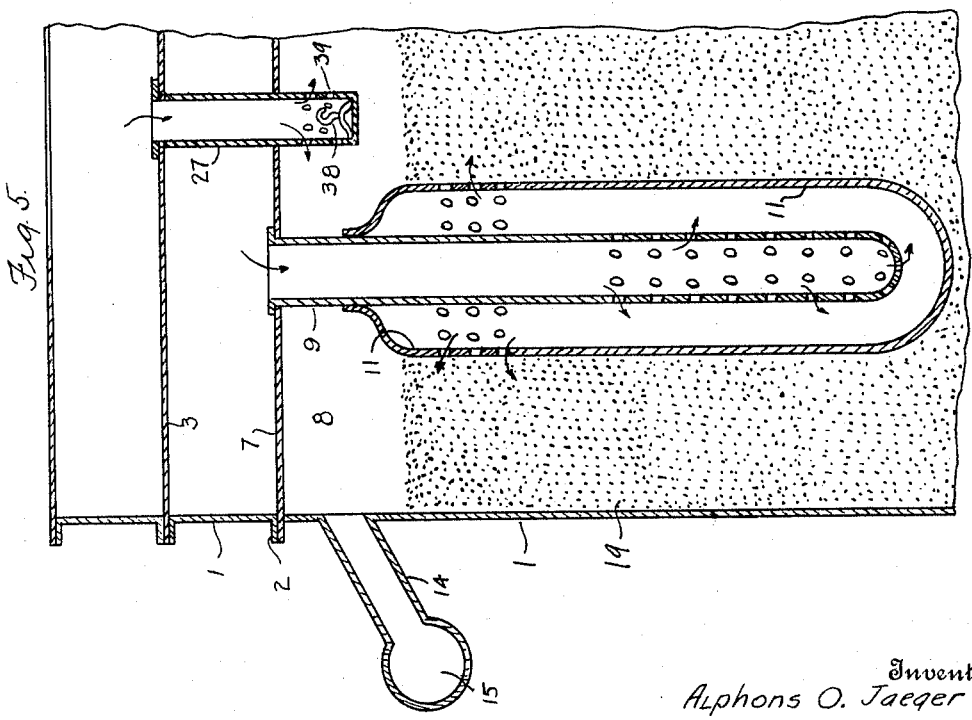
Inventor
Alphons O. Jaeger
By Robert Ames Norton
Attorney April 10, 1934.   A. O. JAEGER   1,953,938
PURIFICATION OF BY-PRODUCT AMMONIA
Original Filed Nov. 21, 1927   5 Sheets-Sheet 3

INVENTOR
Alphons O. Jaeger
BY Robert Ames Norton
ATTORNEY

April 10, 1934.   A. O. JAEGER   1,953,938
PURIFICATION OF BY-PRODUCT AMMONIA
Original Filed Nov. 21, 1927   5 Sheets-Sheet 4
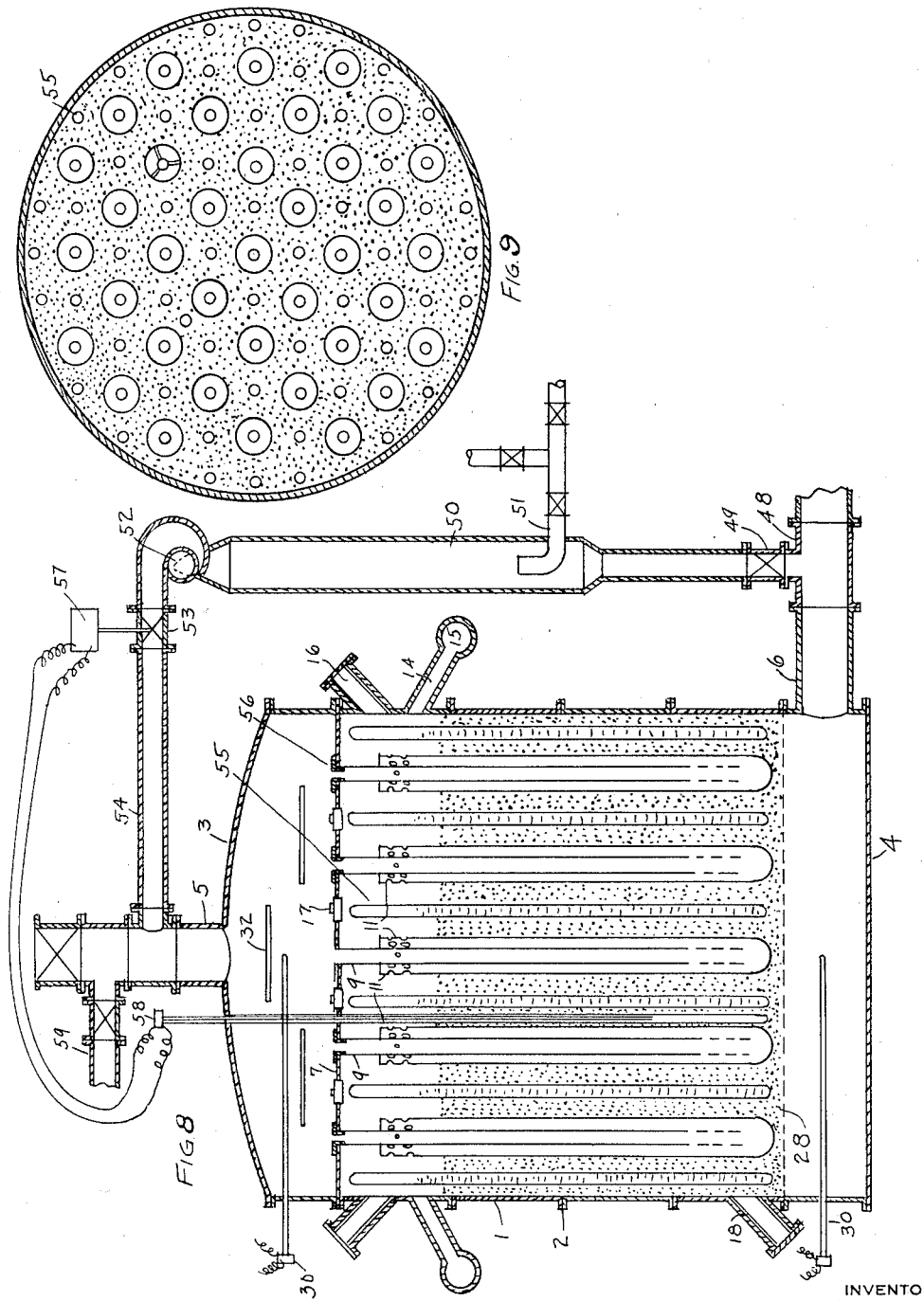
INVENTOR
ALphons O. Jaeger
BY Robert Ames Malin
ATTORNEY April 10, 1934.  A. O. JAEGER  1,953,938
PURIFICATION OF BY-PRODUCT AMMONIA
Original Filed Nov. 21, 1927   5 Sheets-Sheet 5
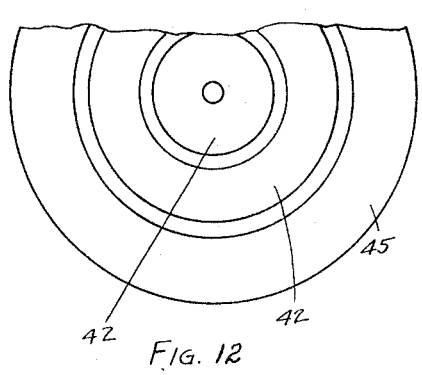
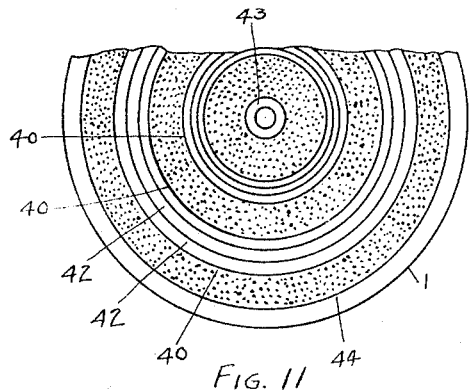
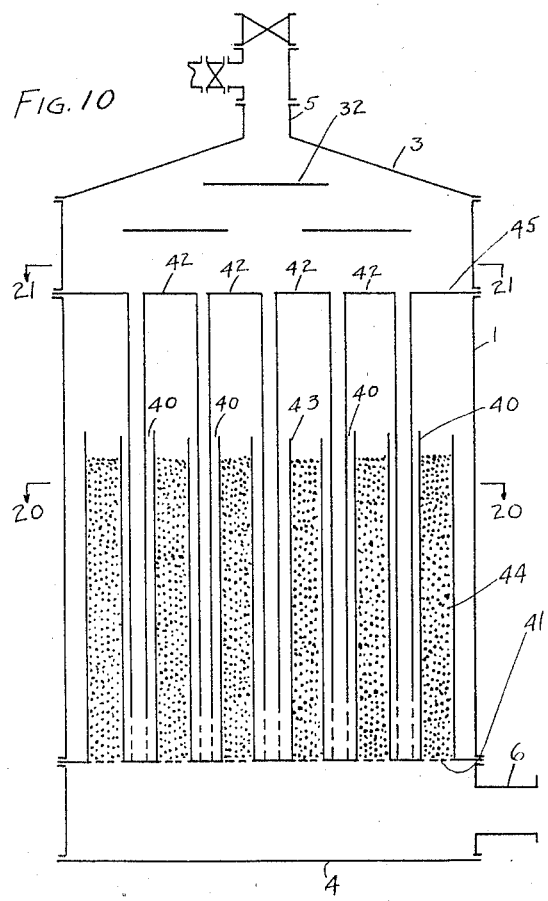
INVENTOR
Alphons O Jaeger
BY
ATTORNEY Patented Apr. 10, 1934

1,953,938

UNITED STATES PATENT OFFICE 1,953,938

PURIFICATION OF BY-PRODUCT AMMONIA

Alphons O. Jaeger, Mount Lebanon, Pa., assignor to The Selden Company, Pittsburgh, Pa., a corporation of Delaware Original application November 21, 1927, Serial No. 234,660. Divided and this application October 22, 1929, Serial No. 401,485

9 Claims. (Cl. 23—193)

This invention relates to the purification of by-product ammonia by the selective oxidation of organic impurities and more particularly to methods of close temperature regulation of such a process.

By-product ammonia is obtained in the distillation of all kinds of nitrogenous organic material such as peat, gas, coal and bituminous shales as well as garbage and other refuse. In all cases in which such distillations are carried out the ammonia forms rather a small percentage of the gaseous products and is contaminated with numerous impurities, the nature of which depends, of course, on the particular source from which the ammonia is obtained and the particular process used in obtaining it. As by far the greatest amount of ammonia produced from such sources is obtained in the manufacture of coal gas and coke for metallurgical processes the invention will be described in connection with ammonia from such sources but it is to be understood that the methods of temperature regulation of the present invention may be used in purifying ammonia or similar inorganic substances from organic impurities regardless of their sources.

The purification of by-product ammonia from organic impurities has presented many difficulties and such purification has in the past been attempted in numerous ways. Solvent processes designed to remove tar, sulfur and cyanogen containing impurities have long been known as have processes involving distillation in rectification columns and those in which the ammonia has been removed from the impurities by means of acid. The purification of impure or partially purified ammonia by a direct process which would in one step eliminate impurities and leave the ammonia in the gaseous condition has, however, been difficult to obtain by means of these processes, while the method of selective combustion of the impurities has depended upon an exact control of the reaction temperatures which has heretofore been difficult to obtain. The necessity of better temperature control and in many cases the removal of large amounts of heat in the strongly exothermic oxidations which are necessary for the combustion of some of the impurities led to the adoption of elaborate schemes and the use of expensive and frequently delicate and complicated apparatus. For example in reactions of this type involving selective combustion converters provided with a large number of very small tubes surrounded by powerful cooling mediums, for example by boiling or non-boiling baths have been suggested, but owing to their great complexity and the difficulty of keeping such structures tight these installations require a high first cost and considerable difficulty in operating.

The present invention is directed to a different method of cooling in which reaction gases furnish the main or primary cooling means and are circulated in heat exchanging relation to the catalyst used for the selective combustion in such a manner as to produce automatic temperature control. This is effected in the present invention by causing the reaction gases to circulate in double countercurrent flow first in indirect heat exchanging relation with the catalyst then, after reversal of flow, in direct heat exchanging relation with the catalyst and finally, after a second reversal of flow, to pass through the catalyst. Preferably the first flow in indirect heat exchange relation with the catalyst is also in direct heat exchanging relation with the counter flow of the gases. This may be effected either by circulating the gases through a large number of small, preferably tubular or circular heat exchanging elements embedded in a catalyst layer or other arrangements and types of heat exchanging elements and catalyst layer may be used which produce the same type of cooling gas flow. A number of the modifications and modified forms of apparatus in which the principles of the present invention can be used are illustrated in the drawings in diagrammatic form. The double counter flow of the reaction gases through heat exchanging elements embedded in or associated with the catalyst layer or layers permits first an exceedingly cheap and simple converter construction eliminating by far the greater number of welded or gas tight connections and it also presents great advantages in operation. First, relatively large catalyst layers are used at which once solves the problem of uniform catalyst permeability so serious when a large number of relatively small catalyst tubes are used. The second very vital advantage lies in the fact that the reaction gases in cooling the catalyst are themselves gradually, uniformly and efficiently heated up to the required reaction temperature without the necessity of using additional fuel.

The difficult problem of purification of ammonia and similar inorganic compounds from organic impurities by selective catalytic oxidation is thus solved by the automatic cooling features of the present invention. The heat evolved in such vapor phase organic catalytic oxidations is directly proportional to the amount of reaction gases passed through the catalyst in a unit time, assuming substantially uniform conversion such as is obtained in the converter systems described. The amount of primary cooling used in the present invention in which the reaction gases themselves constitute the cooling medium is also directly proportional to the amount of reaction gases flowing through. Therefore, once suitably adjusted for a given reaction the cooling is automatic and does not vary with fluctuation in loading over wide limits determined only by the range of loadings giving substantially uniform conversions and by the cooling factor of converter structure such as the converter shell which factor in some cases can be substantially eliminated by a thorough insulation or suitable heating. This feature is of the utmost importance in sensitive organic oxidations, for with the inevitable fluctuations in flow which must occur when such a purification process is dependent on the fluctuating out-put of coke ovens or other gas producing plants it is practically impossible to provide for a perfectly uniform flow of reaction gases through the catalyst at all times. Such fluctuations are, however, automatically equalized by the cooling principles of the present invention. There is no danger, therefore, of fluctuations in the loading raising the temperature of the catalyst which in the course of the purification of many by product ammonias causes the reaction to become uncontrollable. The average organic oxidation whether to an intermediate product or for the purpose of catalytically burning out certain selected impurities is in unstable equilibrium and sudden increases in loading such as occur in the catalytic purification of ammonia produce increased evolution of heat and tend to become uncontrollable as the effects of increased loading become cumulative. The problem is solved by means of the present invention with its automatic cooling feature in a simple and efficient manner.

It should be understood that it is not necessary to circulate all of the reaction gases in double counter-current heat exchanging relation with the catalyst although in many cases this is the preferred method. The range of impurities which may be present in by-product ammonia is very large, extending from such easily combustible substances as phenol, toluol, aliphatic alcohols and ketones to the extremely stable coal tar hydrocarbons such as naphthalene, anthracene and phenanthrene. The reaction temperature necessary to burn out the impurities as well as the degree of heat evolved in the reaction will, therefore, vary in each case with the nature and amounts of the impurities to be removed and, therefore, while it is desirable in some cases to preheat all of the material to be purified it may be in other cases desirable to heat up only a portion of the reacting gas and in such cases a portion only may be circulated in heat exchanging relation with the catalyst. For example in cases where such volatile hydrocarbons as benzol or toluol are present as impurities it may be undesirable to subject these reaction components to contact with the hot surfaces of the heat exchangers. In such cases the air or oxidizing gas may be circulated through the heat exchangers and the organic substances may be introduced directly at any desirable temperature. Further modifications of flow may be used for chemical reasons or to improve the temperature control.

While it is an important advantage of the present invention that in the case of many reactions the simple automatic method of cooling by means of the reaction gases in a countercurrent heat exchange with the catalysts may be used to control the reaction in an extraordinarily simple manner, the invention is in no sense limited to the use of this cooling means as the sole method of controlling the reaction and it may be associated with other methods, such as for example heat equalizing elements, which may be of homogeneous composition and high heat conductivity or which may contain liquids, whether boiling or non-boiling. Such means may be used to remove a portion of the exotherm of the reaction or they may serve solely the purpose of maintaining or equalizing the temperature throughout the catalyst.

In some reactions the heat evolved is so great that the total quantity of reaction gases do not possess sufficient heat capacity to remove all of the heat generated. In such cases it is necessary to provide for an additional heat removing means which may be of the most varied character, for example recirculation of part or all of the gases may be used so that a portion of the reacting and reacted gases are used more than once as heat removing agents. These methods also permit dilution of the reacting gases which is of importance in the controlling of the purification. A number of these auxiliary means are illustrated diagrammatically in the drawings and it is understood that the principle of the present invention may be applied either alone or in conjunction with other cooling or temperature controlling means whether new or old and it is an advantage of the present invention that it is extremely flexible and its principle may be utilized in conjunction with various types of converter structure. The extent to which the principles of the invention are used and the absence or choice of auxiliary cooling media in all cases will be determined by the skilled chemical engineer after a careful consideration of the requirements of the particular reaction or installation involved.

The great flexibility of the present invention permits a very uniform cooling of the catalyst by suitable placement of heat exchange elements, with uniform or non-uniform gas flows, and it is thus possible in many cases to achieve not only a total control of reaction but also a uniformity of reaction throughout the catalyst or zones thereof which is of great importance in increasing the load and also in many cases in prolonging the life of the catalyst.

The automatic cooling provided in the present invention permits, as has been pointed out above, great variations of load and in many cases this may be translated into increased output. However, in some cases it may be desirable to restrict the out-put in order to still further improve the temperature control and the efficiency of the control in the present invention may therefore be used to either permit a greater loading, that is to say a greater gross out-put, or it may be used to provide a better percentage yield at the same gross out-put. In every case, however, an improved total out-put is obtained and the particular use which is made of the cooling features of the present invention must of course be dictated by the requirements of the particular reaction and the particular installation.

The present invention has been described above more particularly in conjunction with highly exothermic purification of by product ammonia containing large amounts of organic impurities and some of its most important applications are to be found in this field. It should be understood, however, that the present invention does not in its broader scope cover merely a cooling means but on the contrary should be considered as a temperature controlling means and even in the purification of by-product ammonias containing small amounts of organic impurities and which are so slightly exothermic as to render outside heat necessary the principles of the present invention are equally applicable even though it may not be possible to save the use of fuel for heating. The present invention provides for a very reliable temperature control preventing not only excessive temperatures but tending also to prevent the temperature dropping too low and permitting the greatest possible utilization of the heat of reaction.

The invention will be described in greater detail in connection with the drawings which show in diagrammatic form a large number of modifications to which the present invention is susceptible. It is to be understood that no one of these modifications can be stated as the preferred one in all cases, but the wide range of conditions and compositions of the impurities will necessitate in each case a choice of the particular modification. The drawings which are purely diagrammatical in nature and which in many cases may be considered almost in the light of reaction flow sheets are, therefore, intended simply as illustrative of a few examples of the way in which the present invention may be carried out. It should be understood, of course, that the skilled chemical engineer will design his converter and choose his apparatus accessories in accordance with the best practice of the art, following the principles outlined in the present invention.

In the drawings:

Fig. 1 is a vertical cross section through a converter showing the automatic gas cooling feature of the present invention;

Fig. 2 is a horizontal cross section through Fig. 1;

Figs. 3 and 4 are details of the method of supporting the heat exchange elements;

Fig. 5 is a vertical cross section through a converter showing the automatic gas cooling feature of the present invention and having an internal heat exchanger;

Fig. 6 is a detail of a converter with modified heat exchanger construction;

Figs. 8 and 9 are vertical and horizontal sections through a converter showing both circulation and heat equalizing means;

Fig. 10 is a vertical section through a converter having annular heat exchange elements;

Figs. 11 and 12 are horizontal sections along the lines 20—20—21—21 of Fig. 10.

Figure 7:
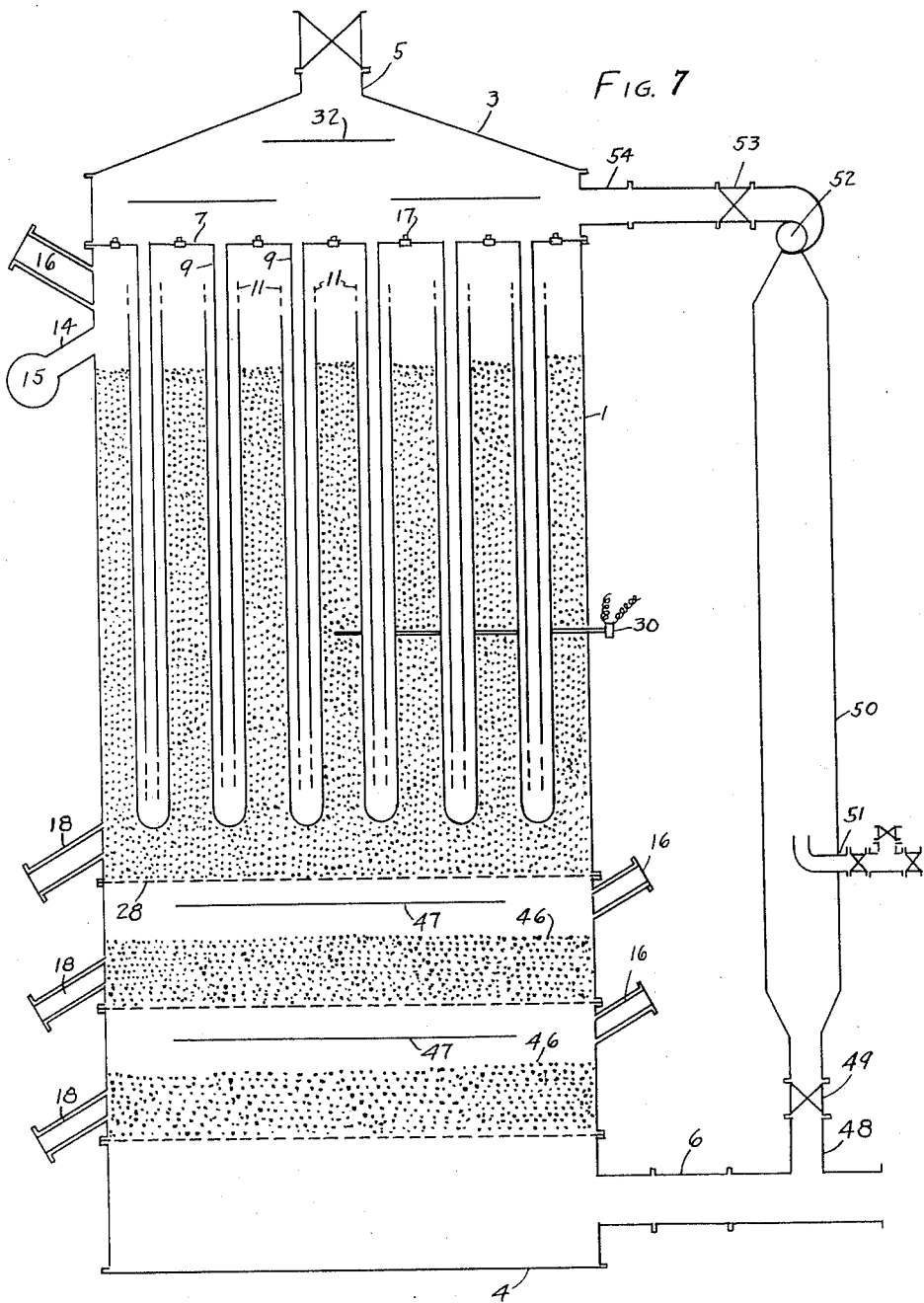
Fig. 7 is a vertical section through a converter showing recirculating means.

In the drawings in Fig. 1 the catalyst is shown in granular form but is conventionally shown by stippling in the remaining figures. It should be understood that the representation of the catalyst is only a conventional representation and the invention is not in any sense limited to the use of particular types or shapes of catalysts.

The converter shown on Fig. 1 consists of an outer shell formed of rings 1 provided with flanges 2 and connected to a top piece 3 and bottom piece 4. The reaction gases enter the top piece through the pipe 5, are distributed by means of the baffles 32 and thence pass down through the central cooling tubes 9 and then up in the outer cooling tubes 11 in the opposite direction. The tubes 11 are attached to the inner tubes 9 by any suitable fastening, such as a bayonet fastening illustrated in Figs. 3 and 4, the pin 10 entering into the bayonet slot in the tube 11. Other fastenings such as short chains, hooks and the like may also be employed. The inner cooling tubes 9 are, of course, firmly mounted in the top plate 7 and the alignment of tubes 9 and 11 may be preserved by spacing lugs 12.

The gases after passing up through the tubes 11 emerge through perforations at the top of the tubes into the upper gas space 8 and thence flow down through the catalyst 19. The catalyst is retained by the screen or perforated bottom 13 through which the reacted gases pass into the lower space of the converter and thence out through the exhaust pipe 6.

Catalyst can be introduced either through the side openings 16 or through the openings in the plate 7 which are closed by the plugs 17. Catalyst can be removed through the outlet 18. The pipes 16 and 18 may, if desired, be filled with suitable inert material. Temperatures at various points are measured by the thermometric elements 30 which are illustrated in the form of electric pyrometers but may, of course, be of any other suitable type. Where additional cooling gases are desired at the surface of the catalyst where the most violent reaction takes place, these gases may be introduced through the pipes 14 from the collector pipe 15.

In operation, the cold or cooled gases entering first pass down through the tubes 9 in indirect heat exchanging contact with the catalyst but in direct heat exchanging relation with the ascending gases in tubes 11. The gases are thus gradually warmed up and after emerging from the open end of tubes 9, they rise in tubes 11 in direct heat exchanging relation with the catalyst and in counterflow to the flow of gases through the catalyst. In the case of exothermic reactions, the catalyst is very hot and the gases in ascending the tubes 11 are rapidly and progressively heated, the rise in temperature being somewhat moderated by the cooling action of the down flowing gases in tubes 9 so that the gases emerging from the top of tubes 11 are not at an excessively high temperature. The heated reaction gases, with or without further addition of cool or cold gases through the pipes 14, then pass through the catalyst where the reaction takes place. The catalyst, however, does not become overheated as it is in intimate heat exchanging relation with the tubes and is cooled by the incoming gases. Too violent reaction in the upper zones of the catalyst is effectively prevented by the fact that the gases contacting with the upper layers of the catalyst are partly cooled by the gases in the tubes 9 and may be mixed with a suitable amount of cold or cooler gases through the pipes 14.

It will be seen that the incoming cold gases are preheated in the converter in a steady, regular manner and at the same time the catalyst itself is cooled. All of the heat of the catalyst, or substantially all, is thus utilized for heating the incoming gases and the manner of flow permits a very even cooling action, while at the same time the provision of the pipes 14 makes it possible to control sudden increases in temperature in the upper catalyst zones by a sudden and large increase in the inflow of cold or cooler gases. Where the reaction does not produce excessive heat per unit of reacting gases or where sudden overheating of the catalyst is not to be feared, the auxiliary cool gas pipes 14 may be dispensed with.

The heat evolved throughout the catalyst is, of course, by no means uniform since by far the greatest percentage of reaction and correspondingly of heat evolution takes place in the first catalyst layers and a rather steep temperature gradient may, therefore, exist in the catalytic layers from the top to the bottom. This temperature gradient is effectively utilized by causing the cold gases emerging from the bottom of the tubes 9 to come into heat exchanging relation first with a portion of the catalyst which is at a relatively low temperature and then, as they are heated up and as they rise in the tubes 11, the gases come into contact with progressively hotter and hotter catalyst so that at all times, the gases are subjected to a temperature differential sufficient to cause a large and steady flow of heat from the catalyst to the gases. At the same time, the excessive temperatures which might otherwise be produced in the upper catalyst layers are to some extent moderated by the fact that the rising gases not only absorb heat from the catalyst, but also give off a certain increasing amount of heat to the incoming cold gases in the tubes 9.

The converter shown in Figs. 1 to 4 is well suited for the catalytic purification of by-product ammonia by the selective total combustion of impurities and illustrates the broad heat exchange feature of the present invention in its simplest form.

The catalyst may be prepared as follows:

36 parts of $V_2O_5$ are dissolved in 33.6 parts of 100% KOH in 900 volumes of water and to this solution 290 parts of kieselguhr are added. A solution containing 52.8 parts of ferric sulfate is added to the suspension with vigorous agitation in order to precipitate iron vanadate uniformly throughout the kieselguhr. The reaction mixture after freeing from the mother liquor is suspended in a potassium aluminate solution which has been prepared by the treatment of 88.8 parts of aluminum sulfate plus 18 $H_2O$ with caustic potash, the solution containing 600 parts of water. The suspension is then treated with 123 parts of 33° Bé. potassium waterglass and if necessary a part of the excess alkali is neutralized by normal sulfuric acid. A gelatinous mass is formed which is pressed and dried and constitutes a zeolite body in which iron vanadate and kieselguhr are embedded as diluents.

Crude coal tar ammonia is mixed with air in sufficient amounts to insure complete combustion or transformation into harmless products of the organic and inorganic impurities, such as pyridines, phenols, organic sulfur compounds, and the like. The air ammonia mixture is then preheated to 320° C. before introduction into the converter and is further heated up in the heat exchange elements to 370° C. before the gases pass through the contact mass. By using the process of the present invention as illustrated in figures from 1 to 4 a very high loading is possible as in general the percentage of impurities in ammonia is small and a great accumulation of heat in the contact mass is not to be feared. The purified ammonia leaving the converter is, of course, worked up in the usual manner and salts prepared from this ammonia are completely colorless and odorless and meet the most rigorous specifications for purified ammonium salts.

The preheating of air or reaction gases which has been mentioned above may be effected in any suitable manner, for example by using a heat exchanger external to the converter in which the gases after passing through the converter serve to give up part of their heat to the incoming gases. The particular design of the heat exchanger used forms no part in the present invention and any suitable type can be used in which the gases flow parallel or in countercurrent. The combination of an external heat exchanger with the internal automatic heat exchange elements permits a very effective temperature balance and assures uniform preheating of the reaction gases to the desired reaction temperature in a simple and economical manner.

Fig. 5 illustrates a modified converter form, using the heat of the exhaust gases by extending both tubes, 9 and 11 beyond the lower perforated plate 13 into the exhaust chamber of the converter. Baffles 33 may be provided in order to bring the exhaust gases into more intimate heat exchanging contact with the tubes 11. This converter is of advantage where it is desired to maintain an even temperature gradient throughout the whole of the catalyst and where it is necessary to preheat the incoming gases to a relatively high temperature. The converter is also very advantageous for use in gases where it is desirable to rapidly cool the exhaust gases.

Fig. 6 shows a modification of the heat exchanging elements somewhat similar to that shown in Fig. 5, but instead of using an outer tube 11 open at the tube in the automatic heat exchange elements, this tube is closed at the top and is provided with suitable perforations just below the level of the catalyst, so that the heated gases pass out into the catalyst without mixing with the cooled gases coming through pipes 27. The inner tube 9 is shown perforated, but may also be solid with open bottom. The perforation of the inner tube 9 permits the incoming gases to escape over larger area and, therefore, prevents creation of a cold spot at the bottom of tube 11 as sometimes may take place when the full blast of the incoming gases strikes the bottom of the tube.

Fig. 7 illustrates a modification using control means in addition to the primary automatic, heat exchange elements. This converter type, which is particularly important for purification reactions which are highly exothermic utilizes in addition to the heat exchange elements recirculation of part or all of the reacted gases. A simple construction is shown in Fig. 7 in which the converter contains a cooled catalyst layer provided with simple automatic heat exchange elements followed by two uncooled catalyst layers 46, each being preceded by baffle plate 47 which causes the gases passing out from the catalyst layer through the perforated separating screen 48 to be deflected toward the outer shell of the converter where they are partially cooled before passing through the first uncooled catalyst layer and whereby they are also thoroughly mixed. A similar baffle plate placed before the second layer also performs the same function. Instead of permitting all the reaction gases to pass out through pipe 6, all or a portion is recirculated through the branch pipe 48 controlled by the valve 49 into the mixing chamber 59 where the composition of the gases may be suitably adjusted if desired by means of the pipe 51, which is provided with valves and branches to permit the introduction of a plurality of gases. From the mixing chamber the gases pass into the suction of pump 52 which may preferably be of the blower type as illustrated in the drawings. From the pump the gases pass through the pipe 54 controlled by valve 53 into the upper space of the converter and are then recirculated through the automatic heat exchange elements together with fresh gases which may be introduced through the valve pipe 5. It is thus possible by recirculating part of the reacted gases to maintain the concentration of the reacting components within any suitable range and this is a most effective method of control as it decreases the amount of heat evolved per unit of gas passed through the converter. This simplifies the control which is effected by the automatic heat exchange elements. The automatic heat exchange maintains the catalyst temperature constant within wide ranges of loadings but where the exotherm of the reaction with high concentration of reacting components is greater per unit of reacted gases than that necessary to heat the same amount of gas from the entrance temperature to the reaction temperature, it is obvious that over-heating must take place. Control of the latter factor is most effectively achieved by recirculation which varies the concentration of the reacting gases, and, therefore, the amount of heat evolved per unit of gas, so that the automatic heat exchange devices can satisfactorily control exothermic reactions in which the heat evolved at high reaction gas concentrations is greater than necessary to heat up the incoming gases.

In the drawings the automatic heat exchange elements have been shown as round tubes or circular annuli. These shapes are the cheapest and simplest and for many reactions the most desirable. The particular shape of the elements forms, however, no part in the present invention and they may be of any suitable shape such as for example square, polygonal, or elliptical, or the like. In the case of tubular elements or the annuli they may be square, polygonal or elliptical. The choice of shape will be determined by the skilled engineer, taking into consideration cost, convenience and assembly. In some cases rectangular or hexagonal elements have some advantage as they can be placed very closely and therefore decrease the thickness of catalyst zones between them. These constructions are frequently desirable where the exotherm is very high.

While it is an advantage of the present invention that the converters and heat exchange elements may be made of relatively cheap metals, such as iron, aluminum and the like, it should be understood that any other metals may be used which are either inert or catalytically active. In the case of some metals which exert a deleterious catalytic influence on the reaction, either in the elementary form or in the form of their oxides, it may be desirable to inactivate these metals by coating the surfaces contacting with the gases with various anti-catalytic substances, such as for example alkali or alkaline earth metal salts. A good example of substances which may be used are potassium phosphate, potassium sulfate or bisulfate, and the like.

This is a division of my pending application Serial No. 234,660 filed November 21, 1927.

What is claimed as new is:

1. A method of purifying ammonia from organic impurities by reaction with air which comprises passing at least a part of the reacting gases through heat exchanging elements at least partly embedded in a catalyst layer, the gas being in indirect heat exchanging relation with the catalyst, reversing the flow of the gas, and causing it to be in direct heat exchanging relation with the catalyst and with the incoming gas during the reverse flow, again reversing the direction of gas flow and causing it to pass through the catalyst layer the proportion of gas passed through the heat exchange elements being sufficient to maintain the working temperatures of the catalyst and all of the gases being passed through the catalyst.

2. A process according to claim 1, in which additional reaction gas is caused to flow directly through the catalyst without passing through the heat exchangers embedded therein.

3. A method according to claim 1, in which a plurality of catalyst layers are used in series, at least one layer being cooled by the heat exchangers.

4. A method according to claim 1, in which the reaction gas at the end of the first reverse flow is mixed with reaction gases which have not passed through the heat exchangers and the mixture is then caused to flow through the catalyst.

5. A method according to claim 1, in which the temperature in the cooled catalyst layer is equalized by temperature equalizing elements of high heat conductivity.

6. A method according to claim 1, in which the temperature in the cooled catalyst layer is equalized by temperature equalizing elements of high heat conductivity, the heat equalizing means constituting containers filled with liquids of high heat conductivity.

7. A method according to claim 1, in which at least part of the reacted gases are recirculated through the catalyst.

8. A method according to claim 1, in which at least part of the reacted gases are circulated through the heat exchangers and then through the catalyst.

9. A method according to claim 1, in which at least part of the reacted gases are cooled and recirculated through the catalyst.

ALPHONS O. JAEGER.